United States Patent
Takahashi

(10) Patent No.: US 11,132,803 B2
(45) Date of Patent: Sep. 28, 2021

(54) IMAGING APPARATUS, IMAGING SYSTEM, AND METHOD FOR CONTROLLING THE SAME

(71) Applicant: CANON KABUSHIKI KAISHA, Tokyo (JP)

(72) Inventor: Hayato Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/856,764

(22) Filed: Apr. 23, 2020

(65) Prior Publication Data

US 2020/0357126 A1    Nov. 12, 2020

(30) Foreign Application Priority Data

May 9, 2019 (JP) .............................. JP2019-089367

(51) Int. Cl.
 *G06T 7/292* (2017.01)
 *H04N 5/232* (2006.01)
 *G06T 7/70* (2017.01)
 *H04N 5/247* (2006.01)

(52) U.S. Cl.
 CPC ............... *G06T 7/292* (2017.01); *G06T 7/70* (2017.01); *H04N 5/23299* (2018.08); *H04N 5/247* (2013.01); *G06T 2207/30196* (2013.01)

(58) Field of Classification Search
 None
 See application file for complete search history.

(56) References Cited

U.S. PATENT DOCUMENTS

| | | | |
|---|---|---|---|
| 2011/0135154 A1* | 6/2011 | Wedge | G06T 7/292 382/103 |
| 2012/0098986 A1* | 4/2012 | Robertson | H04N 19/61 348/222.1 |
| 2012/0242851 A1* | 9/2012 | Fintel | H04N 5/772 348/221.1 |
| 2015/0054965 A1* | 2/2015 | Sudo | H04N 5/2354 348/169 |
| 2016/0127692 A1* | 5/2016 | Yoneji | G06K 9/00664 348/159 |
| 2018/0310022 A1* | 10/2018 | Edpalm | H04N 19/132 |
| 2019/0306408 A1* | 10/2019 | Hofer | H04N 5/247 |

FOREIGN PATENT DOCUMENTS

JP        2009065381 A    3/2009

* cited by examiner

*Primary Examiner* — Frederick D Bailey
(74) *Attorney, Agent, or Firm* — Canon U.S.A., Inc. IP Division

(57) ABSTRACT

An imaging system includes a plurality of cameras capable of capturing actual images. Of the plurality of cameras, a first camera detects first motion information about a main object. The second camera detects second motion information about the main object. The first camera determines motion information to be used based on the first motion information and the second motion information.

17 Claims, 11 Drawing Sheets

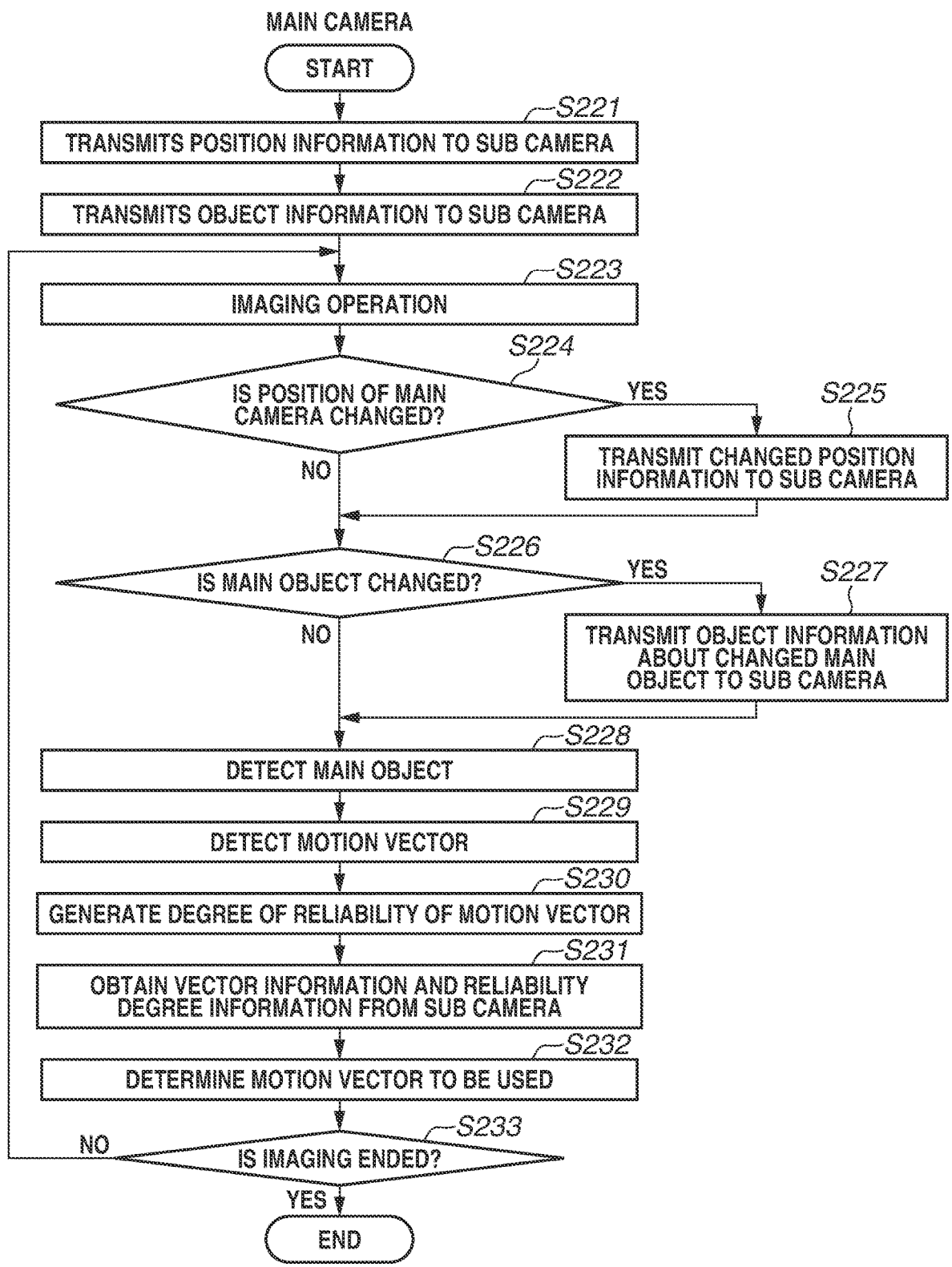

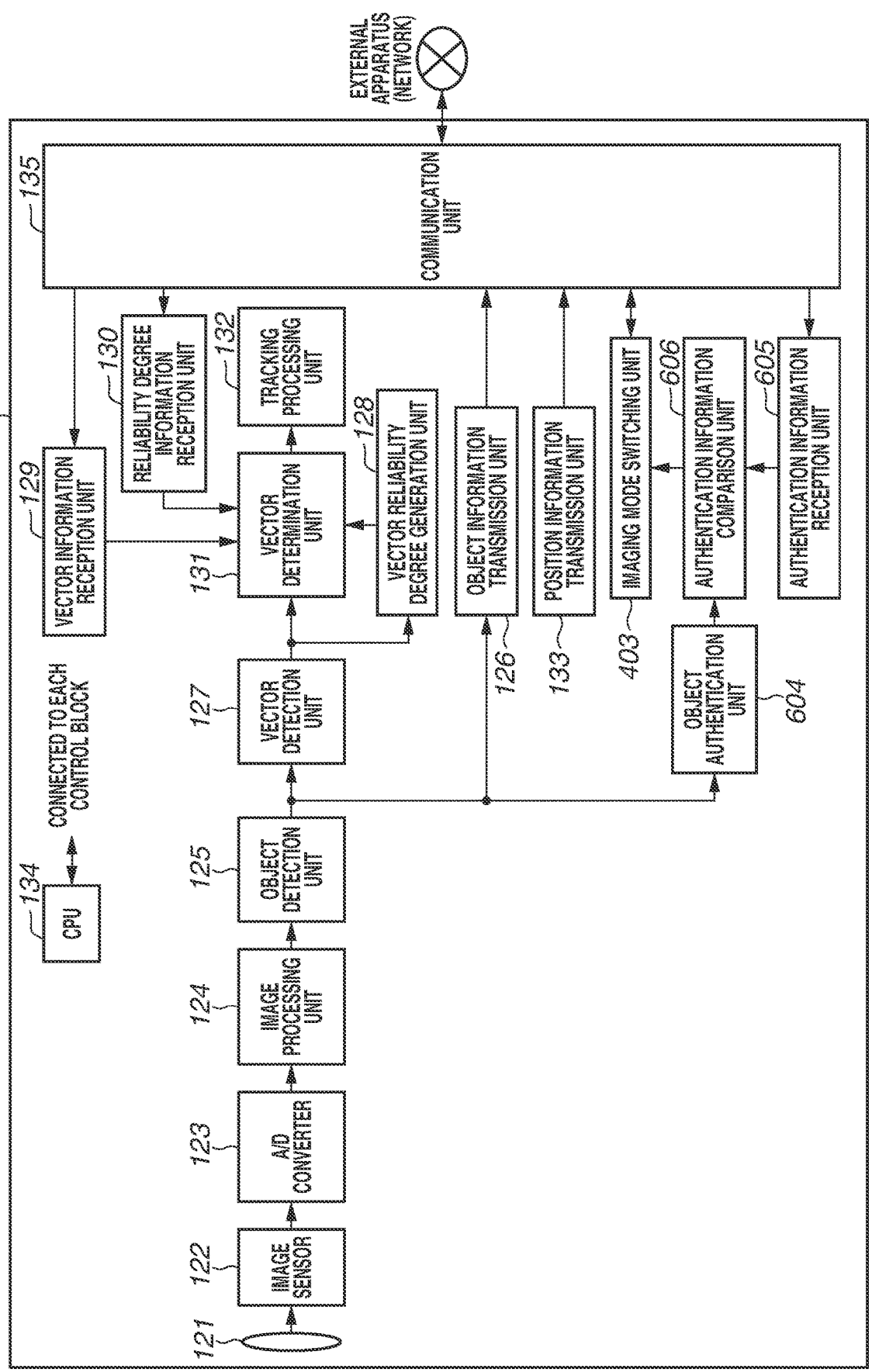

IMAGING APPARATUS, IMAGING SYSTEM, AND METHOD FOR CONTROLLING THE SAME

BACKGROUND OF THE INVENTION

Field of the Invention

The present invention relates to an imaging apparatus, an imaging system, and a method for controlling the same. In particular, the present invention relates to imaging using a plurality of cameras.

Description of the Related Art

Conventionally, there has been a demand to accurately track a moving body that is a main object and capture an image of the moving body, for example, in sports photography. However, depending on a surrounding condition or an object condition, a camera that is currently used to capture an image may not be able to track the main object, for example, in a scene where the main object goes behind another person or object.

To address such an issue, for example, Japanese Patent Application Laid-Open No. 2009-65381 discusses use of a plurality of cameras installed at predetermined positions. The cameras are switched to capture images in succession based on movement of an object, whereby the moving object is tracked by the plurality of cameras. In switching between the cameras to capture the images, imaging conditions such as a motion vector of the camera having been used to capture an image are inherited.

According to an imaging system discussed in Japanese Patent Application Laid-Open No. 2009-65381, the object can be tracked and imaged by sequentially switching to a camera capable of capturing an image of the moving object among the installed cameras based on the movement of the object. In switching between the cameras, time that elapses before the imaging conditions of the switched camera become appropriate can be reduced by inheriting the imaging conditions of the previous camera having been used to capture an image. However, while the technique discussed in Japanese Patent Application Laid-Open No. 2009-65381 can capture an image by switching between the plurality of cameras, imaging accuracy of the camera being used to capture an image is not improved by using information about the cameras not being used to capture an image.

SUMMARY OF THE INVENTION

The present disclosure is directed to providing a unit that, even if a camera being used to capture an image has difficulty in detecting motion of an object, tracks the object by using motion information from another camera.

According to an aspect of the present disclosure, an imaging apparatus includes an imaging unit configured to generate image data, a first motion detection unit configured to detect first motion information about a specific object included in the image data, a second motion detection unit configured to obtain second motion information about the specific object from another imaging apparatus, and a tracking unit configured to generate third motion information based on the first motion information, the second motion information, a degree of reliability of the first motion information, and a degree of reliability of the second motion information, and generate information for tracking the specific object based on the third motion information.

Further features of the present invention will become apparent from the following description of exemplary embodiments with reference to the attached drawings.

BRIEF DESCRIPTION OF THE DRAWINGS

FIGS. 2A and 2B are flowcharts related to determination of a motion vector by imaging apparatuses according to the first exemplary embodiment of the present disclosure.

FIGS. 6A and 6B are block diagrams illustrating a configuration example of an imaging system according to a third exemplary embodiment of the present disclosure.

DESCRIPTION OF THE EMBODIMENTS

Exemplary embodiments of the present disclosure will be described in detail below with reference to the drawings.

Figure 1A:
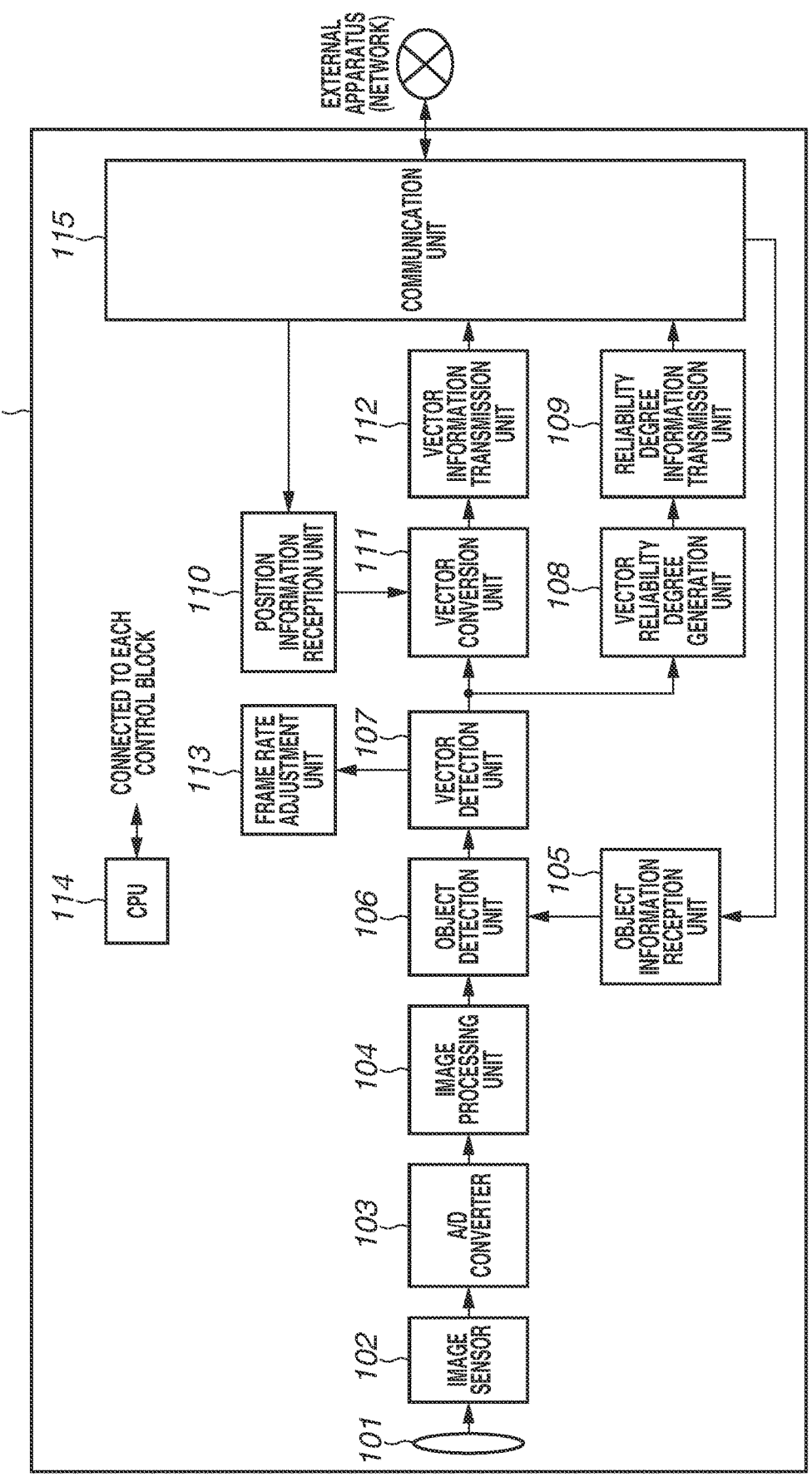
FIGS. 1A and 1B are block diagrams illustrating a configuration example of an imaging system according to a first exemplary embodiment of the present disclosure.
Figure 1B:
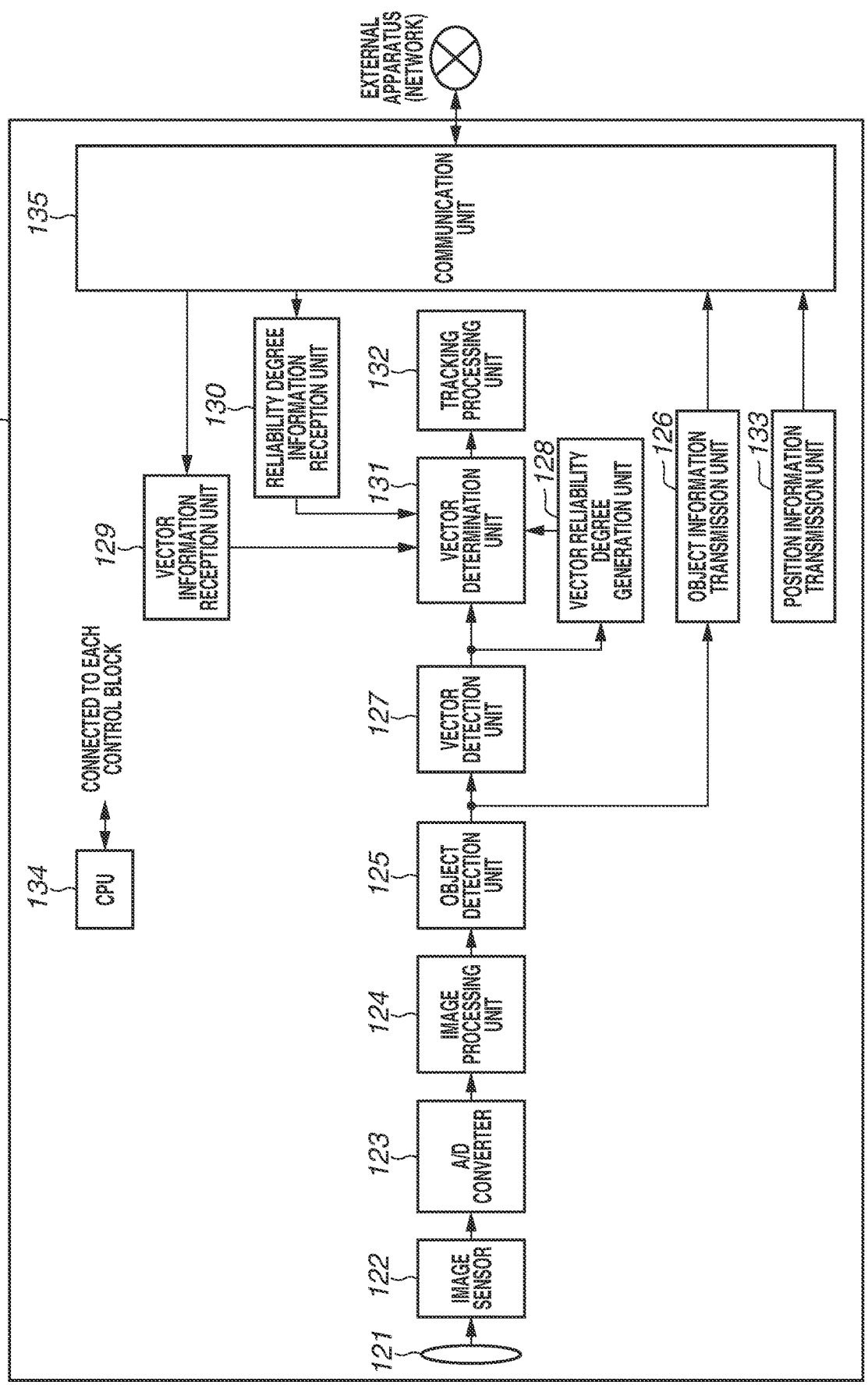

FIGS. 1A and 1B are block diagrams illustrating a configuration example of an imaging system according to a first exemplary embodiment of the present disclosure. The configuration example is merely an example. The present disclosure is not limited to the present exemplary embodiment, and can be applied with an appropriate modification depending on circuit configuration. FIGS. 1A and 1B illustrate the imaging system including a first camera 100 and a second camera 120. An example of each of the first and second cameras 100 and 120, which are imaging apparatuses, is a digital camera.

The first camera 100 includes a lens group 101, an image sensor 102, an analog-to-digital (A/D) converter 103, an image processing unit 104, an object detection unit 106, a vector detection unit 107, a vector reliability degree generation unit 108, a central processing unit (CPU) 114, and a communication unit 115. The second camera 120 includes, as components common with the first camera 100, a lens group 121, an image sensor 122, an A/D converter 123, an image processing unit 124, an object detection unit 125, a vector detection unit 127, a vector reliability degree generation unit 128, a CPU 134, and a communication unit 135.

The lens groups 101 and 121 each include optical elements such as a zoom lens, a focus lens, and a diaphragm, and can optically change a zoom magnification and adjust a focus of an object image.

An object image input via the lens group 101 is focused on the image sensor 102. The object image focused on the image sensor 102 is photoelectrically converted by the A/D converter 103 and is output to the image processing unit 104 as an image signal. Similarly, in the second camera 120, an object image focused on the image sensor 122 is output by the A/D converter 123 to the image processing unit 124 as an image signal.

The image processing units 104 and 124 each apply predetermined processing to the respective image signals generated from the object image, and output, for example, image data including a luminance signal and a color signal for each pixel. For example, the image processing units 104 and 124 each include a digital signal processor (DSP) and perform predetermined image processing, such as color conversion, gamma processing for converting gradations of a signal-processed image, and noise reduction processing, on the digital signals (image signals). The image processing units 104 and 124 can each generate output image data and calculate imaging parameters for controlling the respective imaging apparatuses. Examples of the imaging parameters include parameters used for aperture control, focus adjustment control, and white balance control for adjusting color tint. As employed herein, an operation of driving a lens group, an image sensor, an A/D converter, and an image processing unit to obtain an object image of a nearby object and obtain image data will be referred to as an imaging operation. The image processing units 104 and 124 each perform image processing intended for recording on the captured image data to generate recording image data. The recording image data is recorded in a not-illustrated recording unit. The image processing units 104 and 124 also perform image processing intended for display on the captured image data to generate display image data. The display image data is displayed on a not-illustrated display unit.

The object detection units 106 and 125 each detect the presence or absence of a specific object and a moving state of an object, identify an object type, and recognize the specific object based on the image data respectively processed by the image processing units 104 and 124. The vector detection units 107 and 127 each detect a motion vector of an object detected by the object detection units 106 and 125, respectively. The vector reliability degree generation units 108 and 128 each generate a degree of reliability of the motion vector detected by the vector detection units 107 and 127, respectively.

Each of the CPUs 114 and 134 is connected to a control block via a not-illustrated transmission line (bus). The CPUs 114 and 134 control the entire first camera 100 and the entire second camera 120, respectively. The first and second cameras 100 and 120 each include not-illustrated memories (read-only memory (ROM) and random access memory (RAM)). The CPUs 114 and 134 control functional blocks of the first and second cameras 100 and 120, respectively, and each perform calculation for that purpose based on programs loaded from the respective ROMs. The ROMs store control programs to be executed by the respective CPUs 114 and 134 and various constant values to be used for program execution. The RAMs are areas for storing various types of temporary data to be used for program execution.

The communication units 115 and 135 are each connected to an external apparatus or an external network. The first and second cameras 100 and 120 can each output and obtain an image, control information, object information, and vector information to and from the external apparatus (network) via the communication units 115 and 135, respectively.

Next, the control block specific to each of the first and second cameras 100 and 120 will be described. First, a configuration example of the first camera 100 will be described.

An object information reception unit 105 obtains information about a main object from an external apparatus (network) via the communication unit 115. In the present exemplary embodiment, the object information reception unit 105 obtains information about the main object from the second camera 120. The vector detection unit 107 detects the main object and the motion vector thereof based on the obtained information about the main object. A reliability degree information transmission unit 109 transfers reliability degree information generated by the vector reliability degree generation unit 108 to the external apparatus (network) via the communication unit 115. In the present exemplary embodiment, the output reliability degree information is transmitted to the second camera 120.

A position information reception unit 110 receives position information about the second camera 120 via the communication unit 115. The position information reception unit 110 also detects a position of the first camera 100 on the earth by using, for example, a Global Positioning System (GPS) function. The position information reception unit 110 also detects an orientation (imaging direction) of the first camera 100 based on an output signal from a not-illustrated gyro sensor. A vector conversion unit 111 converts the motion vector detected by the vector detection unit 107 into vector information intended for the second camera 120 based on the obtained position information about the second camera 120 and position information about the first camera 100 that is the own apparatus. A vector information transmission unit 112 transfers the vector information converted by the vector conversion unit 11 to the second camera 120 via the communication unit 115.

A frame rate adjustment unit 113 adjusts an imaging frame rate of the first camera 100. The imaging frame rate is adjusted based on various conditions. In the present exemplary embodiment, the frame rate can be adjusted based on the motion vector detected by the vector detection unit 107. For example, if the motion vector is difficult to be detected, the frame rate can be maximized at the expense of image quality.

Next, a configuration example of the second camera 120 will be described.

An object information transmission unit 126 transfers information about the object detected by the object detection unit 125 to an external apparatus (network) via the communication unit 135. In the present exemplary embodiment, the information about the detected object is transferred to the first camera 100. A vector information reception unit 129 obtains vector information from the external apparatus (network) via the communication unit 135. In the present exemplary embodiment, the vector information reception unit 129 receives the vector information that is converted by the vector conversion unit 111 of the first camera 100 and transmitted from the vector information transmission unit 112. A reliability degree information reception unit 130 can obtain reliability degree information via the communication unit 135. In the present exemplary embodiment, the reliability degree information reception unit 130 receives and obtains the reliability degree information transmitted from the reliability degree information transmission unit 109 of the first camera 100.

A vector determination unit 131 determines a motion vector of the main object based on the degree of reliability generated by the vector reliability degree generation unit 128, the vector information obtained by the vector information reception unit 129, and the reliability degree information obtained by the reliability degree information reception unit 130. A tracking processing unit 132 performs object tracking processing based on the motion vector determined by the vector determination unit 131.

A position information transmission unit 133 outputs position information about the second camera 120 that is the own apparatus to the external apparatus (network) via the communication unit 135. Examples of the position information include position information detected by a GPS function, and information about an imaging direction in which an image is actually being captured that is detected based on an output signal of a not-illustrated gyro sensor.

The first and second cameras 100 and 120 each can be independently used. For example, if a user operates a not-illustrated operation unit of the first camera 100 to power on the first camera 100, the first camera 100 enters an imaging standby state. In the imaging standby state, the first camera 100 performs an imaging operation and displays obtained image data on a not-illustrated display unit as a live view image. Then, if the user operates the operation unit to give an instruction to make preparations for capturing a still image, the image processing unit 104 calculates imaging parameters based on the object by using automatic focus (AF), automatic exposure control (AE), and automatic white balance (AWB) functions. If an instruction to capture a still image is received, the image processing unit 104 records an object image as the still image in the not-illustrated recording unit. If an instruction to capture a moving image is given, the image processing unit 104 starts recording the object image as moving image data in the not-illustrated recording unit. If an instruction to stop capturing the moving image is given, the image processing unit 104 stops recording the moving image data. Here, the image processing unit 104 performs a framing-supporting operation. Examples thereof include tracking a specific object and displaying a tracking frame, calculating imaging parameters adjusted to the object, and if the object goes out of an angle of view, performing an automatic zoom control and displaying a direction of the object.

Similar to the first camera 100, the second camera 120 can also be used independently.

In the present exemplary embodiment, the first and second cameras 100 and 120 can be connected via a network and used with each other. A mode where the first and second cameras 100 and 120 are connected via a network and used to perform object tracking processing by the second camera 120 will be referred to as a cooperation mode.

Object tracking by a plurality of cameras according to the first exemplary embodiment using such a cooperation mode will be described in detail with reference to FIGS. 2A, 2B, and 3. In the present exemplary embodiment, as illustrated in FIG. 3, the first and second cameras 100 and 120 are used to track the main object. While the description below deals with a case of using two cameras as an example, the number and positions of cameras are not limited thereto. Each of the plurality of cameras may be a handheld camera, an installed camera, or a camera fixed or mounted on a tripod for imaging, as long as the plurality of cameras each performs an imaging operation.

Figure 2A:
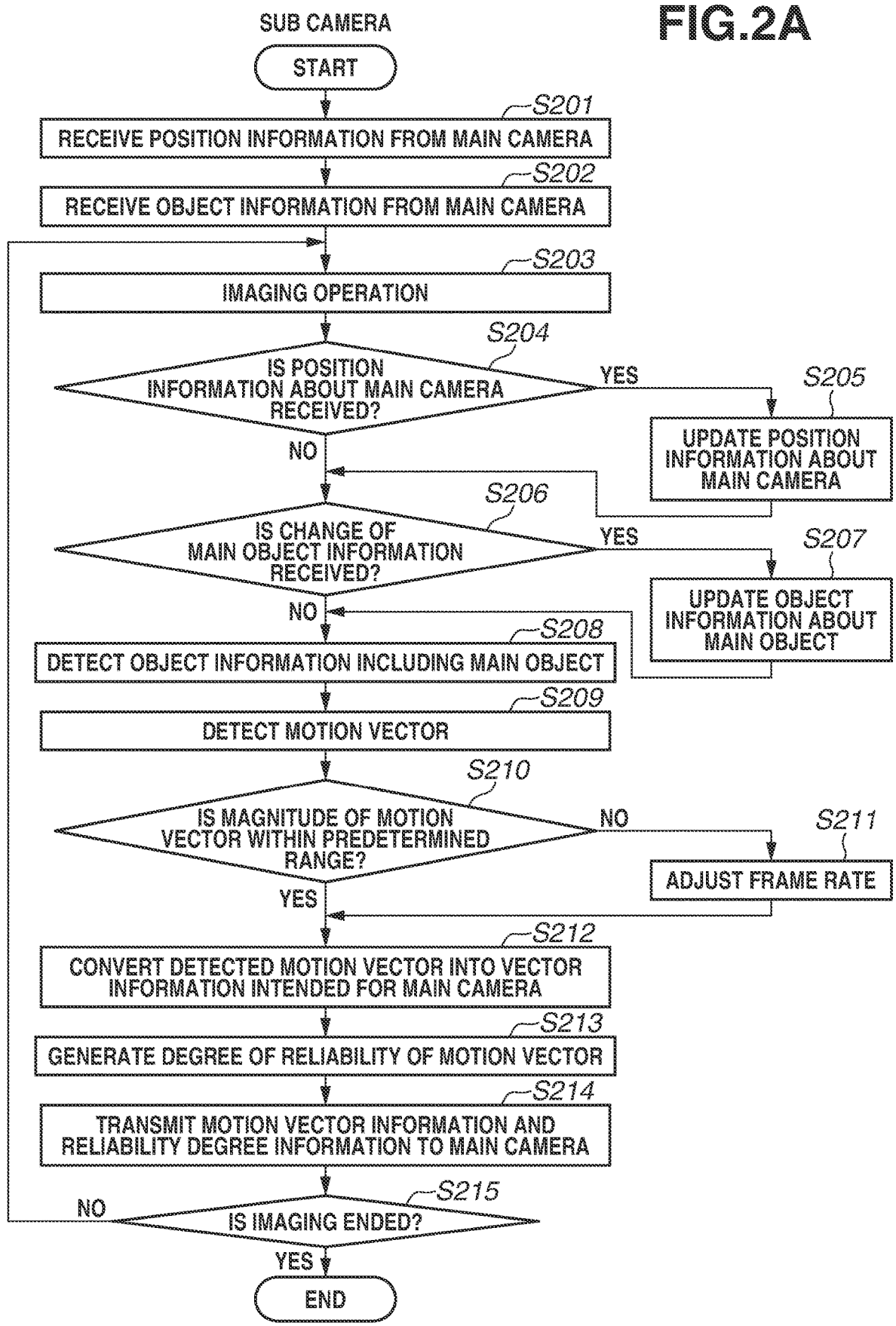
Figure 3:
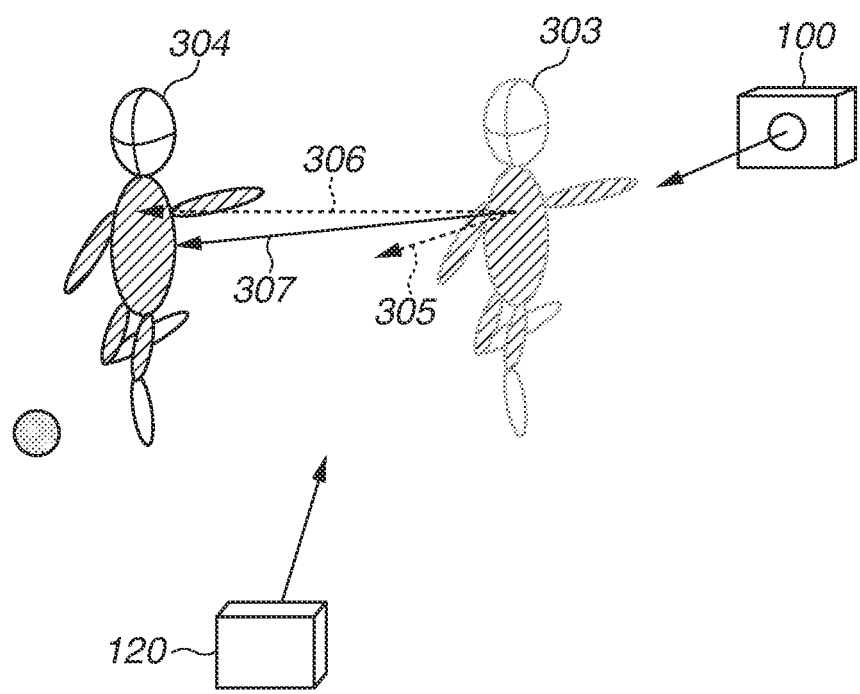
FIG. 3 is a diagram illustrating examples of motion vectors detected by the imaging apparatuses according to the first exemplary embodiment of the present disclosure.

FIGS. 2A and 2B are flowcharts related to determination of a motion vector by the imaging apparatuses according to the first exemplary embodiment. FIG. 2A illustrates a flowchart of the first camera 100, and FIG. 2B illustrates a flowchart of the second camera 120. FIGS. 2A and 2B illustrate, as an example, a case where the first camera 100 is used as a sub camera (operates in a sub camera mode) and the second camera 120 is used as a main camera (operates in a main camera mode). The main camera records an object as image data such as still image data and moving image data. The sub camera is used to obtain supplementary information for increasing accuracy of object recognition by the main camera. Thus, the sub camera does not record a captured image; however, the sub camera may be configured to record the captured image. For example, the user sets the first and second cameras 100 and 120 to the cooperation mode, and then sets which is used as the main camera and which is used as the sub camera.

In the present exemplary embodiment, to increase the tracking accuracy of the main object by the main camera, the sub camera detects a motion vector, and the main camera tracks the main object by using the detected motion vector and a motion vector detected by the main camera. The flowcharts of FIGS. 2A and 2B are started when the first and second cameras 100 and 120 enter an imaging setting (mode) for capturing images of the main object in cooperation with each other. Examples include when the first and second cameras 100 and 120 are activated and when the cooperation mode is turned on.

The flowchart of FIG. 2A is executed by the CPU 114 controlling each processing block in the first camera 100 that is the sub camera. The flowchart is implemented by the CPU 114 loading a program stored in the ROM (not illustrated) and executing the program.

If cooperative imaging is started, in step S201, the position information reception unit 110 of the sub camera (first camera 100) receives the position information from the main camera (second camera 120) via the communication unit 115.

In step S202, the object information reception unit 105 receives object information including the main object to be tracked from the main camera via the communication unit 115. An example of the object information is image data on the main object. However, the object information may be other than the image data as long as the main object can be identified. Examples thereof may include information about a feature amount of the main object and information about the position where the main object is detected. If the main object is successfully authenticated with object information registered in advance, personal authentication information such as a name and an attribute of the main object may be used as the object information.

In step S203, the CPU 114 performs an imaging operation for driving the lens group 101, the image sensor 102, the A/D converter 103, and the image processing unit 104 to obtain an object image of a nearby object and obtain image data.

In step S204, the CPU 114 determines whether the position information about the main camera is received. If the position information about the main camera is obtained (YES in step S204), the processing proceeds to step S205. If not (NO in step in step S204), the processing skips step S205 and proceeds to step S206.

In step S205, the CPU 114 updates the position information about the main camera stored in the RAM (not illustrated) of the sub camera that is the own apparatus based on the received position information.

In step S206, the CPU 114 determines whether a change of main object information is received from the main camera. If the change of the main object information is received (YES in step in step S206), the processing proceeds to step S207. If not (NO in step S206), the processing proceeds to step S208.

In step S207, the CPU 114 updates the object information about the main object stored in the RAM (not illustrated) in the sub camera based on the received main object information.

In step S208, the object detection unit 106 detects object information including the main object from the captured image data by recognizing the main object and detecting position information about the main object.

In step S209, the vector detection unit 107 detects a motion vector of the main object based on the obtained object information, for example, by making comparison with the position information about the main object recognized in the previous frame.

In step S210, the CPU 114 determines whether a magnitude of the motion vector is within a predetermined range. If the magnitude of the motion vector is not within the predetermined range (NO in step S210), the processing proceeds to step S211. If the magnitude of the motion vector is within the predetermined range (YES in step S210), the processing proceeds to step S212.

In step S211, the frame rate adjustment unit 113 adjusts the frame rate of the sub camera that is the own apparatus based on whether the magnitude of the motion vector is greater than or smaller than the predetermined range. For example, if the motion of the object is so large that the magnitude of the motion vector goes out of the predetermined range, the frame rate is increased to obtain motion vectors in finer steps so that the large motion of the object can be accurately detected. If the motion vector is obtained so finely that the magnitude of the motion vector goes out of the predetermined range, the frame rate can be reduced to reduce unnecessary power consumption and heat generation.

In step S212, the vector conversion unit 111 converts the motion vector detected by the vector detection unit 107 into vector information intended for the main camera based on the position information about the main camera received by the position information reception unit 110. For example, based on a positional relationship between the main and sub cameras in a three dimensional space, the vector conversion unit 111 calculates a motion vector of the main object when viewed from the main camera by triangulation from the motion vector of the main object obtained by the sub camera. As for the position information about the main camera, the position information and the imaging direction of the main camera may be stored or position information about the main camera with respect to the sub camera may be stored as long as a positional relationship between the imaging directions of the sub and main cameras can be recognized.

In step S213, the vector reliability degree generation unit 108 generates the degree of reliability of the motion vector detected by the vector detection unit 107. For example, a motion vector is calculated based on a positional relationship of a plurality of feature points detected from the main object between the current frame and the previous frame. The degree of reliability of the motion vector is determined, for example, based on the number of feature points detected for the sake of detection of the motion vector. The greater the number of feature points, the higher the degree of reliability of the motion vector.

In step S214, the vector information transmission unit 112 and the reliability degree information transmission unit 109 transmit the vector information converted by the vector conversion unit 111 and the reliability degree information (degree of reliability) generated by the vector reliability degree generation unit 108 to the main camera.

In step S215, the CPU 114 determines whether the imaging in the cooperation mode is ended. If the imaging is ended (YES in step S215), the processing of the present flowchart ends. If the imaging continues (NO in step S215), the processing returns to step S203. In step S203, the CPU 114 captures an image at the predetermined frame rate. The processing of steps S203 to S215 in the present flowchart is repeated until the imaging is ended.

The flowchart of FIG. 2B is executed by the CPU 134 controlling each processing block in the second camera 120 that is the main camera. The flowchart is implemented by the CPU 134 loading a program stored in the ROM (not illustrated) and executing the program.

If the cooperative imaging is started, in step S221, the position information transmission unit 133 of the main camera (second camera 120) transmits the position information about the main camera to the sub camera.

In step S222, the object information transmission unit 126 transmits object information including information about the main object to the sub camera. For example, the object information transmission unit 126 transmits object information based on the image data captured immediately before, information about the main subject specified by a user operation, object information matched by condition setting, and/or information about a registered object to the sub camera as the object information.

In step S223, the CPU 134 performs an imaging operation for driving the lens group 121, the image sensor 122, the A/D converter 123, and the image processing unit 124 to obtain an object image of a nearby object and obtain image data.

In step S224, the CPU 134 determines whether the position of the main camera that is the own apparatus is changed. If the position of the main camera is changed (YES in step S224), the processing proceeds to step S225. If the position is not changed (NO in step S224), the processing proceeds to step S226.

In step S225, the CPU 134 transmits the changed position information to the sub camera (first camera 100).

In step S226, the CPU 134 determines whether the main object is changed. For example, the CPU 134 makes the determination based on the image data captured in step S223 or a user operation. If the main object is changed (YES in step S226), the processing proceeds to step S227. If the main object is not changed (NO in step S226), the processing proceeds to step S228.

In step S227, the CPU 134 transmits object information about the changed main object to the sub camera (first camera 100).

In step S228, the object detection unit 125 detects the main object.

In step S229, the vector detection unit 127 detects the motion vector of the main object.

In step S230, the vector reliability degree generation unit 128 generates the degree of reliability of the motion vector detected by the vector detection unit 127. For example, the vector reliability degree generation unit 128 generates the degree of reliability based on the number of feature points detected for the sake of calculation of the vector information.

In step S231, the vector information reception unit 129 and the reliability degree information reception unit 130 obtain the vector information and the reliability degree information transmitted from the vector information transmission unit 112 and the reliability degree information transmission unit 109.

In step S232, the vector determination unit 131 determines a motion vector to be used by the main camera based on the motion vector detected in step S229, the degree of reliability generated in step S230, and the vector information and the reliability degree information obtained in step S231.

In step S233, the CPU 134 determines whether the imaging is ended. If the imaging is ended (YES in step S233), the processing of the present flowchart ends. If the imaging continues (NO in step S233), the processing returns to step S223. In step S223, the CPU 134 performs an imaging operation. The processing of steps S223 to S233 in the present flowchart is repeated until the imaging is ended. The imaging is determined to be ended and the flowcharts of FIGS. 2A and 2B end, for example, in such cases as where an image captured by the main camera is recorded as a still image based on a user instruction, where the recording of a moving image is discontinued, and where the cooperation mode of the cameras is cancelled.

The present exemplary embodiment has been described by using a configuration where position information about an imaging apparatus is transmitted and received after start of control as an example. However, in a configuration where imaging apparatuses are installed in advance in a stadium or the like, each of the imaging apparatuses may be configured to have stored an installation position of the other in advance. Alternatively, the position information about each camera may be stored in a different server (external apparatus) via a network.

FIG. 3 is a diagram illustrating examples of motion vectors detected by the imaging apparatuses according to the first exemplary embodiment. The main camera (second camera 120) and the sub camera (first camera 100) each capture an image of an object, and detect a motion vector between an object 303 before movement and an object 304 after movement. A vector 305 represents the motion vector detected by the main camera. A vector 306 represents the motion vector detected by the sub camera. A vector 307 represents the motion vector to be finally used by the main camera. Suppose that the maximum value of a degree of reliability of each motion vector is 10, and the vector 305 has a degree of reliability of 2 and the vector 306 has a degree of reliability of 9, for example. In such a case, the motion vector represented by the vector 307 is determined based on a ratio of the degrees of reliability of the vectors 305 and 306, i.e., 2 and 9. For example, the motion vector is determined by averaging the vectors 305 and 306, taking into account the weight assigned thereto based on the degrees of reliability.

As described above, in the present exemplary embodiment, the tracking accuracy can be improved by tracking the main object using the vector information detected by the plurality of cameras. For example, in the case of installed cameras, automatic tracking can be performed by driving the imaging angles of view in pan and tilt directions using the obtained vector information. For example, in the case of handheld cameras, imaging conditions targeted for a specific person (face) can be set by tracking AF and tracking AE. In addition, framing support can be implemented by tracking a main object going out of the angle of view and displaying the position (direction) of the main object outside the angle of view.

In the present exemplary embodiment, the motion vectors are used as motion information about the main object. However, this is not restrictive, and the motion vectors may also be applied to information indicating a movement, such as a tracking frame. In the present exemplary embodiment, the sub camera performs the processing for converting a motion vector into vector information intended for the main camera. However, the sub camera may be configured to simply transmit the motion vector, and the main camera may be configured to convert the motion vector. There may be provided a centralized management apparatus for managing the plurality of cameras, and the centralized management apparatus may convert the motion vector. In the present exemplary embodiment, the motion vector to be used by the main camera is determined by substituting the degrees of reliability of the motion vectors into the ratios in determining the motion vector to be used. However, the calculation method is not limited to that of the present exemplary embodiment as long as the motion vector is determined based on the degrees of reliability.

In the present exemplary embodiment, the sub camera is specialized in obtaining the motion information and changing the frame rate. However, the sub camera may be configured to change the imaging parameters to increase the exposure time or decrease sensitivity as long as acquisition of the motion information can be improved. While the main and sub cameras may capture images independently of each other, the tracking accuracy according to the present exemplary embodiment can be further improved in the state where the main and sub cameras keep track of and capture images of the same main object.

A second exemplary embodiment of the present disclosure will be described. The second exemplary embodiment differs from the first exemplary embodiment in that the relationship of the main and sub cameras (imaging mode) is switched between the plurality of cameras.

Figure 4A:
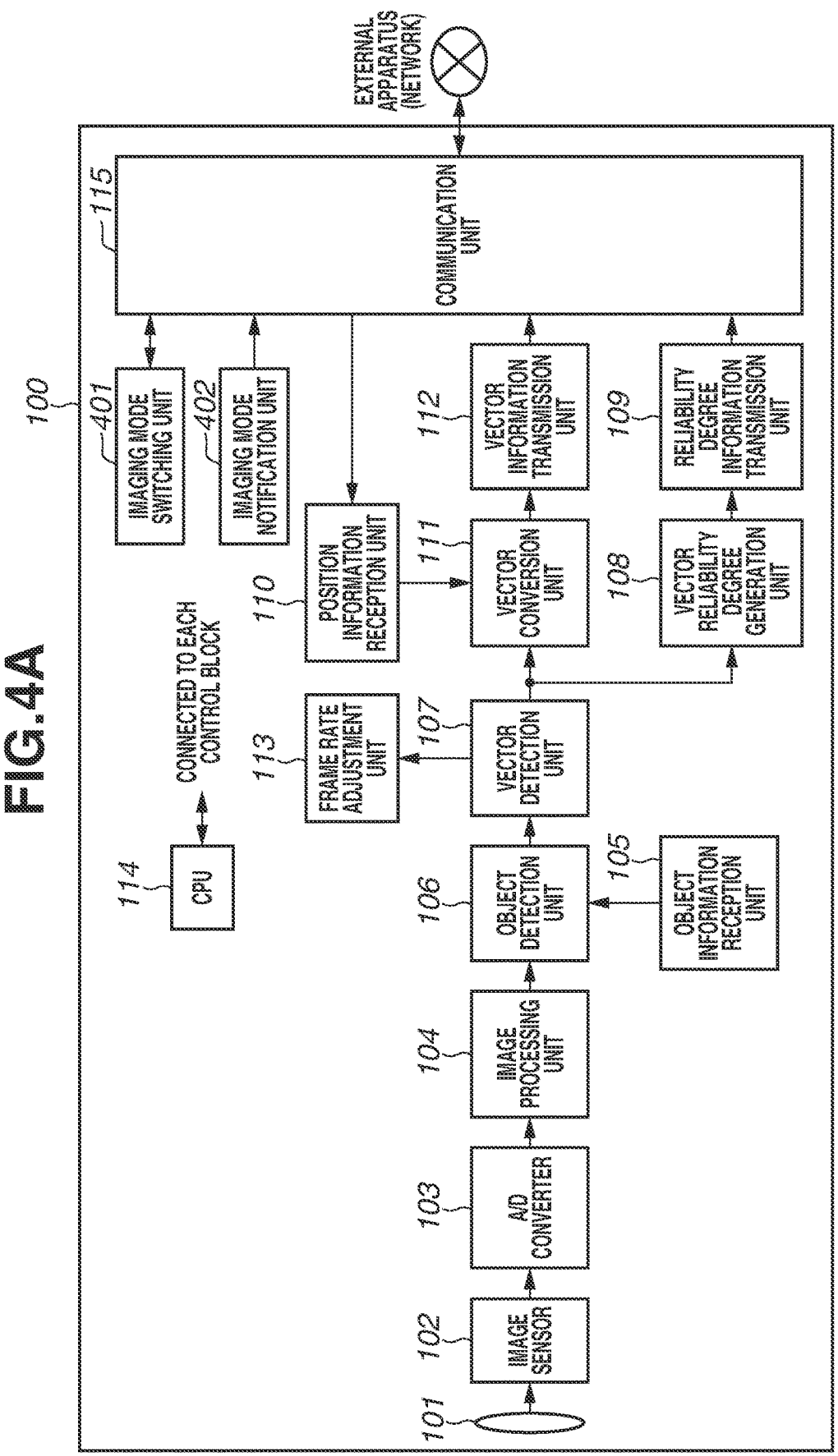
FIGS. 4A and 4B are block diagrams illustrating a configuration example of an imaging system according to a second exemplary embodiment of the present disclosure.
Figure 4B:
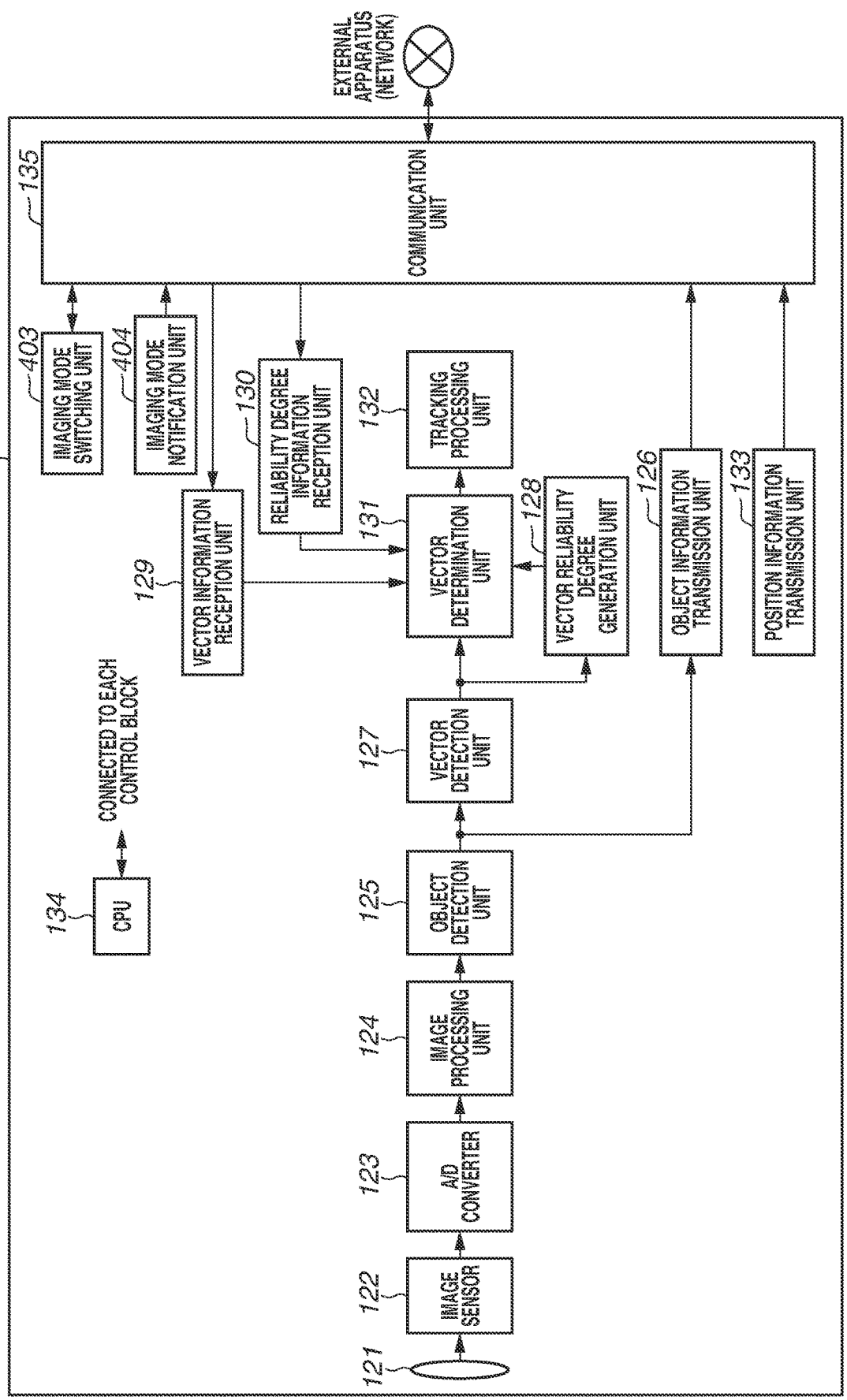

FIGS. 4A and 4B are block diagrams illustrating a configuration example of an imaging system according to the second exemplary embodiment of the present disclosure. In FIGS. 4A and 4B, units (100 to 133) common with FIG. 1 are denoted by the same reference numerals, and descriptions thereof will be omitted. Compared to the configuration example of FIG. 1, the first camera 100 additionally includes an imaging mode switching unit 401 and an imaging mode notification unit 402. The imaging mode switching unit 401 notifies the second camera 120 of a switching request to enter the main camera mode (actual image capturing mode), receives approval or disapproval thereof, and/or cancels the switching request. The imaging mode switching unit 401 also receives a switching request to enter the main camera mode (actual image capturing mode) from the second camera 120 and transmits approval or disapproval thereof. If the switching request output to the second camera 120 is approved or if the switching request from the second camera 120 is approved, the CPU 114 performs switching control such as changing setting values of functional blocks. The imaging mode notification unit 402 notifies an external apparatus (network) of the current imaging mode of the first camera 100.

The second camera 120 additionally includes an imaging mode switching unit 403 and an imaging mode notification unit 404. The imaging mode switching unit 403 notifies the first camera 100 of a switching request to enter the main camera mode (actual image capturing mode), receives approval or disapproval thereof, and/or cancels the switching request. The imaging mode switching unit 403 also receives a switching request to enter the main camera mode (actual image capturing mode) from the first camera 100, and transmits approval or disapproval thereof. If the switching request output to the first camera 100 is approved or if the switching request from the first camera 100 is approved, the CPU 134 performs switching control such as changing the setting values of functional blocks. The imaging mode notification unit 404 notifies an external apparatus (network) of the current imaging mode of the second camera 120.

Figure 5:
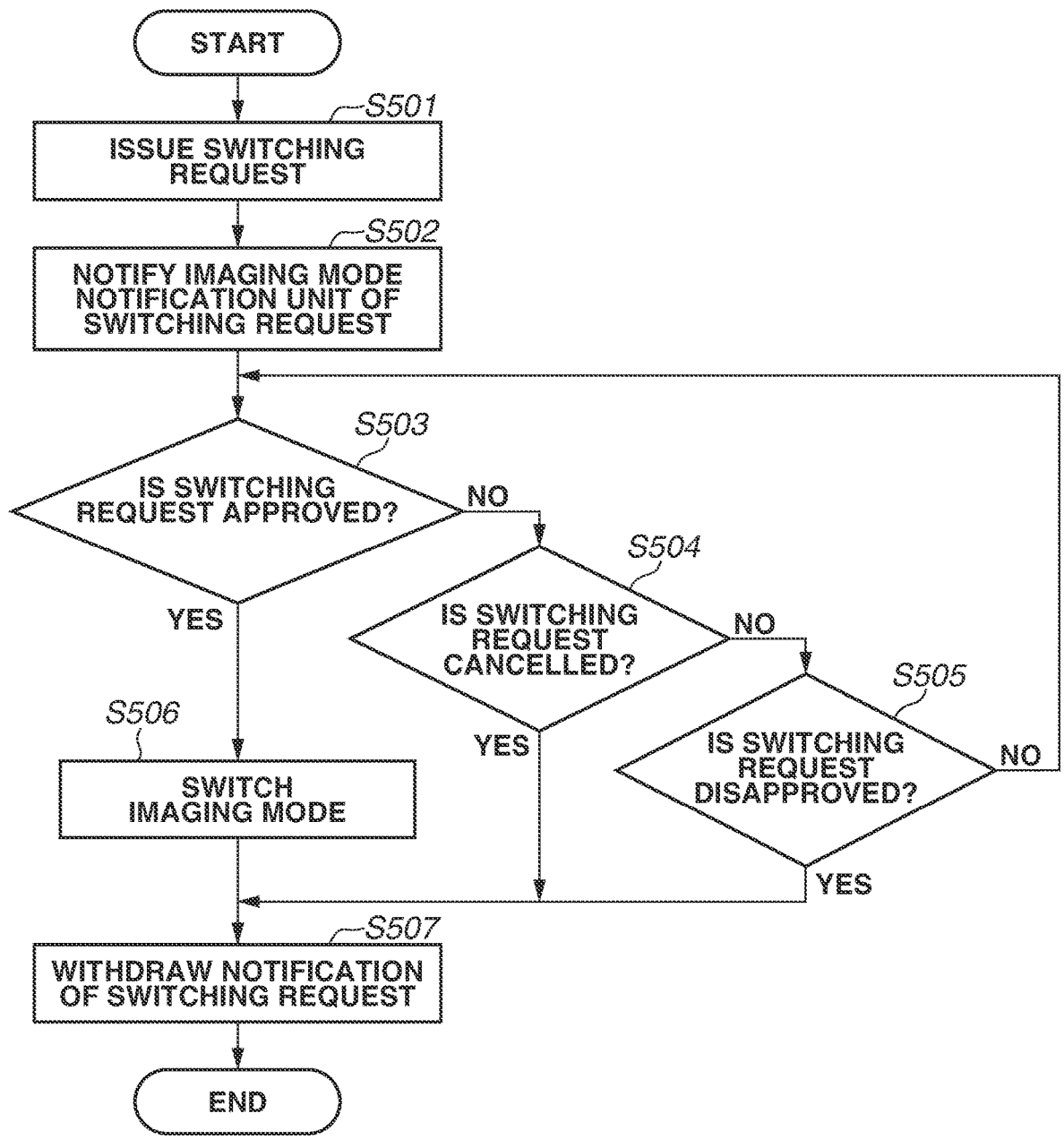
FIG. 5 is a flowchart illustrating imaging mode switching control between main camera and sub camera modes according to the second exemplary embodiment of the present disclosure.

FIG. 5 is a flowchart illustrating imaging mode switching control between the main and sub cameras by the imaging apparatuses according to the second exemplary embodiment. The present flowchart is implemented in the first camera 100 by the CPU 114, and in the second camera 120 by the CPU 134, controlling the processing blocks by loading a program stored in the ROM (not illustrated) and executing the program. The flowchart is started when an instruction to switch between the main and sub camera modes is given to the first camera 100 or the second camera 120, for example, by a user operation. Here, a case where the first camera 100 requests the second camera 120 to switch the main and sub cameras will be described as an example.

If the first camera 100 receives an instruction to switch the imaging mode through a user operation, then in step S501, the imaging mode switching unit 401 issues a switching request to switch the imaging mode to the second camera 120. The switching request to switch the imaging mode can be cancelled by a user operation.

In step S502, the imaging mode notification unit 404 of the second camera 120 is notified of the switching request to switch the imaging mode. For example, the imaging mode notification unit 404 notifies the user of the switching request by displaying the switching request on a not-illustrated display unit. The user can select whether to approve the switching request by using a not-illustrated operation unit.

In step S503, the CPUs 114 and 134 each determine whether the switching request is approved by the second camera 120. If the switching request is not approved (NO in step S503), the processing proceeds to step S504. If the switching request is approved (YES in step S503), the processing proceeds to step S506.

In step S504, the CPUs 114 and 134 each determine whether the switching request from the first camera 100 is cancelled. If the switching request is not cancelled (NO in step S504), the processing proceeds to step S505. If the switching request is cancelled (YES in step S504), the processing proceeds to step S507.

If the switching request is not cancelled, then in step S505, the CPUs 114 and 134 each determine whether the switching request is disapproved by the second camera 120. If the switching request is not disapproved (NO in step S505), the processing returns to step S503. If the switching request is disapproved (YES in step S505), the processing proceeds to step S507.

If, the switching request is approved in step S503, then in step S506, the CPUs 114 and 134 switch the imaging modes (main camera/sub camera modes) of the first and second cameras 100 and 120.

If the imaging modes are switched, the switching request is cancelled, or the switching request is disapproved, then in step S507, the notification of the switching request is withdrawn.

As described above, in the second exemplary embodiment, the main camera intended for recording and the sub camera intended for information supplement can be switched, for example, by a user operation. The switching of the imaging mode can be requested by either of the main and sub cameras.

A third exemplary embodiment of the present disclosure will be described. The third exemplary embodiment differs from the first and second exemplary embodiments in that the relationship between the main and sub cameras is switched based on a predetermined condition.

Figure 6A:
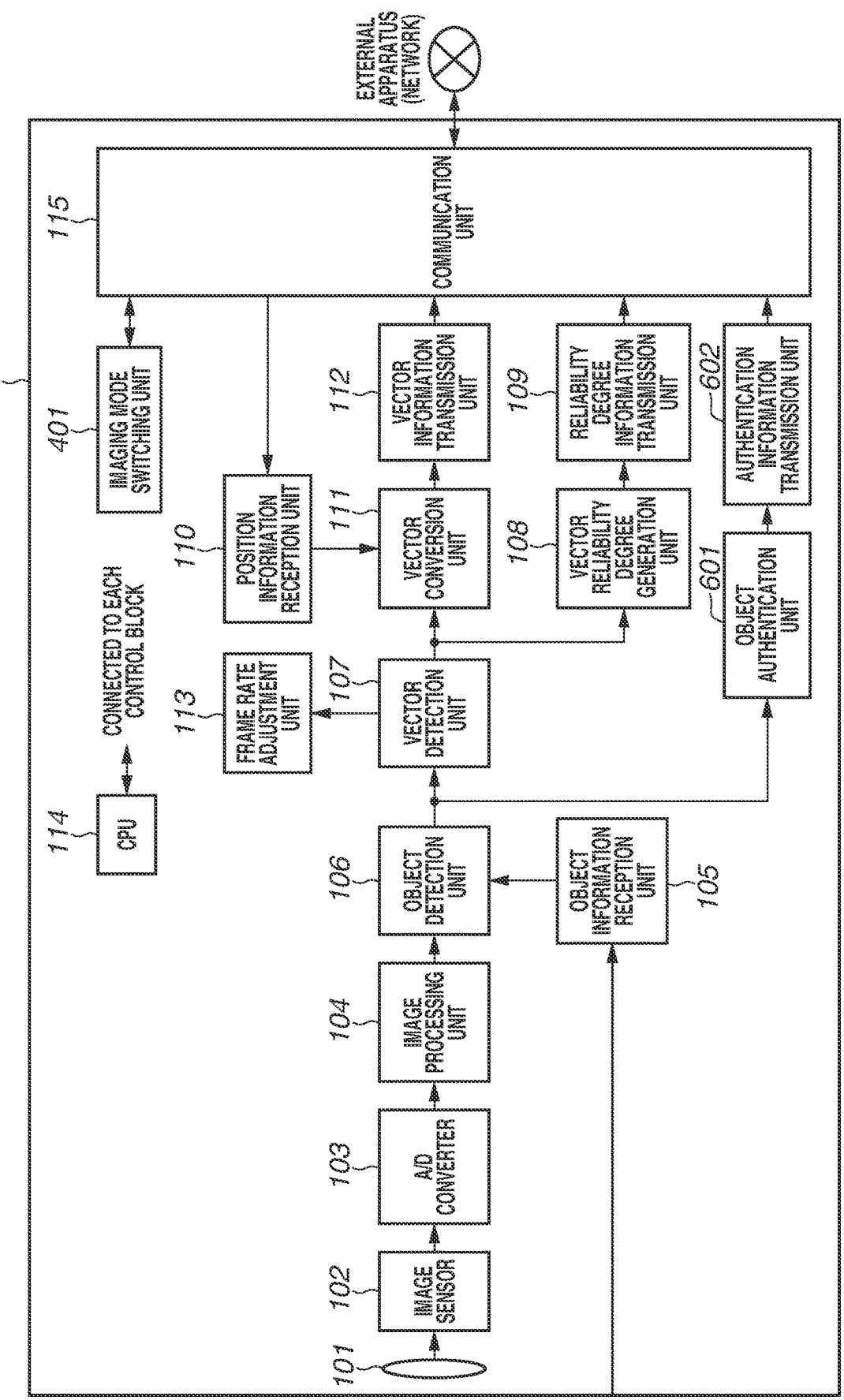

FIGS. 6A and 6B are block diagrams illustrating a configuration example of an imaging system according to the third exemplary embodiment of the present disclosure. In FIGS. 6A and 6B, a unit common with FIG. 1 or 4 is denoted by the same reference numeral. A description thereof will be omitted. In the present exemplary embodiment, the first camera 100 additionally includes an object authentication unit 601 and an authentication information transmission unit 602. The object authentication unit 601 performs authentication to determine whether an object detected by the object detection unit 106 is a main object, and measures an authentication rate. In the present exemplary embodiment, the authentication rate refers to a rate of time during which the object is successfully authenticated as the main object per unit time. The authentication information transmission unit 602 transmits the authentication rate measured by the object authentication unit 601 to the second camera 120. The authentication rate may be calculated from the number of frames instead of time.

The second camera 120 additionally includes an object authentication unit 604, an authentication information reception unit 605, and an authentication information comparison unit 606. The object authentication unit 604 performs authentication to determine whether an object detected by the object detection unit 125 is the main object, and measures an authentication rate. The authentication information reception unit 605 receives the authentication rate transmitted from the authentication information transmission unit 602. The authentication information comparison unit 606 compares the object authentication information (authentication rates) of the first camera 100 and the second camera 120.

Figure 7:
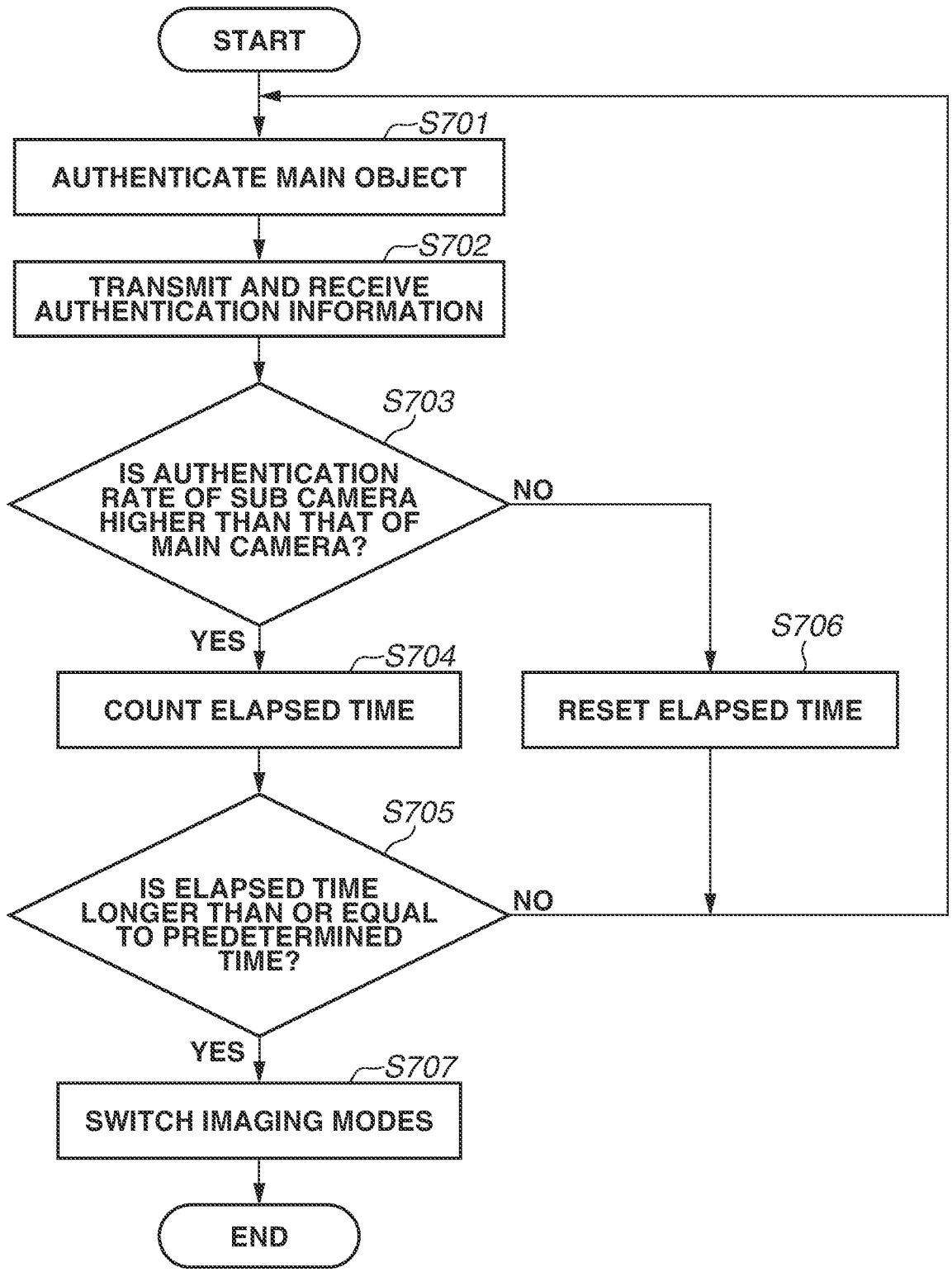
FIG. 7 is a flowchart illustrating an example of imaging mode switching determination between main camera and sub camera modes according to the third exemplary embodiment of the present disclosure.

FIG. 7 is a flowchart illustrating an example of determination whether to switch the imaging modes of the main and sub cameras according to the third exemplary embodiment. A case where the first camera 100 serves as the main camera and the second camera 120 as the sub camera will be described as an example. The flowchart of FIG. 7 is implemented in the first camera 100 by the CPU 114, and in the second camera 120 by the CPU 134, controlling each processing block by loading a program stored in the ROM (not illustrated) and executing the program. The switching determination according to the present flowchart is started as appropriate while the first and second cameras 100 and 120 are in the imaging setting (mode) for capturing images of the main object in a cooperative manner. For example, the switching determination may be performed at predetermined time intervals. The switching determination may be triggered by a predetermined condition such as when a large change occurs due to a change of an object.

If the switching determination is started, then in step S701, the object authentication units 601 and 604 of the first camera 100 (main camera) and the second camera 120 (sub camera) each authenticate a main object.

In step S702, the authentication information transmission unit 602 of the first camera 100 transmits authentication information, and the authentication information reception unit 605 of the second camera 120 receives the authentication information. The authentication information here includes the authentication rate that is the rate of time during which the main object is successfully authenticated per unit time.

In step S703, the authentication information comparison unit 606 of the second camera 120 receiving the authentication information compares between the authentication rates of the first and second cameras 100 and 120 per common unit time, and determines whether the authentication rate of the sub camera is higher than that of the main camera. If the authentication rate of the second camera 120 that is the sub camera is higher than that of the first camera 100 that is the main camera (YES in step S703), the processing proceeds to step S704.

In step S704, the CPU 134 counts elapsed time.

In step S705, the CPU 134 determines whether the elapsed time is longer than or equal to a predetermined time, i.e., whether the state in which the authentication rate of the sub camera is higher than that of the main camera has lasted for a predetermined time or longer. If the state where the authentication rate of the sub camera is higher has lasted for the predetermined time or longer (YES in step S705), the processing proceeds to step S707. If not (NO in step S705), the processing returns to step S701.

In step S703, if the authentication rate of the main camera is higher (NO in step S703), the processing proceeds to step S706. In step S706, the CPU 134 resets the elapsed time. Then, the processing returns to step S701.

If the time elapsed in the state where the authentication rate of the sub camera is higher than that of the main camera is longer than or equal to a predetermined time, then in step S707, the imaging mode switching units 401 and 403 switches the imaging modes of the respective cameras. Then, the processing of the present flowchart ends. In the present exemplary embodiment, the imaging modes are switched by the first camera 100 changing its settings from the main camera to the sub camera and the second camera 120 changing its settings from the sub camera to the main camera.

As described above, according to the third exemplary embodiment, in a case where a plurality of cameras is capturing images in a cooperative manner, the state of the surrounding environment, objects, or the cameras is determined from the captured images, and a camera having a higher authentication rate of the main object can be used as the main camera for imaging. In the present exemplary embodiment, switching of the imaging modes of the cameras is performed after a predetermined elapsed time from when the authentication rate of the sub camera becomes higher to prevent frequent switching of the imaging modes of the cameras that occurs if the imaging modes of the cameras are immediately switched when the main object fails to be authenticated. For example, in a case where installed cameras capture images by automatic tracking, mode switching involves not much complicated user operations compared to a case of handheld imaging. In such a case, higher priority may be given to the imaging by a camera having a higher authentication rate of the main object, and the predetermined time for making the determination about the mode switching may be reduced.

In the present exemplary embodiment, the results of detection and authentication of the main object's face or body are used to determine the authentication rates. However, as long as detection information about the main object is used, the authentication rates are not limited thereto. Moreover, while the sub camera is used to compare the authentication rates and determine the switching of the imaging modes, this is not restrictive. The main camera may be configured to make the comparison and determination. A centralized management apparatus for managing the plurality of cameras may be used to make the comparison and determination.

According to an exemplary embodiment of the present disclosure, even if a camera used for imaging has difficulty in detecting the motion of an object, the object can be tracked by using motion information from another camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-089367, filed May 9, 2019, which is hereby incorporated by reference herein in its entirety.

What is claimed is:

1. An imaging apparatus comprising:
    an imaging unit configured to generate image data;
    a first motion detection unit configured to detect first motion information about a specific object included in the image data;
    a second motion detection unit configured to obtain second motion information about the specific object from another imaging apparatus;
    a tracking unit configured to generate third motion information based on the first motion information, the second motion information, a degree of reliability of the first motion information, and a degree of reliability of the second motion information, and generate information for tracking the specific object based on the third motion information;
    a switching unit configured to switch between at least two imaging modes including a main camera mode where an image is captured to record the image data and a sub camera mode where an image is captured to obtain supplementary information; and
    a display unit configured to provide notification about which of the imaging modes of the main camera mode or the sub camera mode is operating.

2. The imaging apparatus according to claim 1, wherein the second motion information is information obtained by converting motion information detected by the other imaging apparatus into information about motion of the object viewed from an own apparatus.

3. The imaging apparatus according to claim 1, further comprising a conversion unit configured to convert the second motion information into motion information from a perspective of the imaging apparatus based on a positional relationship with the other imaging apparatus.

4. The imaging apparatus according to claim 1, wherein the first motion information, the second motion information, and the third motion information are motion vectors of the specific object.

5. The imaging apparatus according to claim 1, wherein the switching unit is configured to, when switching the imaging modes, notify the other imaging apparatus of a switching request to switch the imaging modes, and then switch the imaging modes.

6. The imaging apparatus according to claim 5, further comprising a cancellation unit configured to cancel the switching request.

7. The imaging apparatus according to claim 1, further comprising a reception unit configured to receive a switching request from the other imaging apparatus,
wherein the switching unit is configured to, in a case where the switching request from the other imaging apparatus is received, approve the switching request based on a user operation, and then switch the imaging modes.

8. An imaging apparatus comprising:
an imaging unit configured to generate image data;
a first motion detection unit configured to detect first motion information about a specific object included in the image data;
a conversion unit configured to convert the first motion information into second motion information from a perspective of another imaging apparatus based on a positional relationship with the other imaging apparatus;
an output unit configured to output the second motion information to an external apparatus;
a switching unit configured to switch between at least two imaging modes including a main camera mode where an image is captured to record the image data and a sub camera mode where an image is captured to obtain supplementary information; and
a display unit configured to provide notification about which of the imaging modes of the main camera mode or the sub camera mode is operating.

9. The imaging apparatus according to claim 8, further comprising a frame rate adjustment unit configured to, in a case where a magnitude of a motion vector included in the detected first motion information is greater than a predetermined range, increase a frame rate of the imaging unit, and in a case where the magnitude of the motion vector is smaller than the predetermined range, reduce the frame rate of the imaging unit.

10. A method for controlling an imaging system including a plurality of imaging apparatuses configured to generate image data, the method comprising:
capturing an image of an object by each of the first and second imaging apparatuses;
detecting first motion information about a specific object included in the object by the first imaging apparatus;
detecting second motion information about the specific object by the second imaging apparatus;
generating information for tracking the specific object based on the first motion information, the second motion information, and a positional relationship between the first and second imaging apparatuses; and
switching between at least two imaging modes between the first and second imaging apparatuses, the at least two imaging modes including a main camera mode where an image is captured to record the image data and a sub camera mode where an image is captured to obtain supplementary information,
wherein in a case where the first imaging apparatus generates the information for tracking the specific object, the second motion information is converted into motion information from a perspective of the first imaging apparatus based on the positional relationship between the first and second imaging apparatuses.

11. The method for controlling the imaging system according to claim 10, wherein the plurality of imaging apparatuses is configured to independently change their respective positions and imaging angles of view.

12. The method for controlling the imaging system according to claim 10, wherein the first motion information and the second motion information include information about a motion vector of the specific object and a degree of reliability of the motion vector.

13. The method for controlling the imaging system according to claim 10, further comprising, before the switching of the imaging modes:
outputting a switching request to switch the imaging modes; and
approving, disapproving, or cancelling the switching request,
wherein if the switching request is approved, the imaging modes are switched.

14. The method for controlling the imaging system according to claim 10, wherein in a case where the first imaging apparatus operates in the main camera mode, the second imaging apparatus operates in the sub camera mode, and the image data generated by the second imaging apparatus is determined to be more appropriate as an actual image to be recorded than the image data generated by the first imaging apparatus, the at least two imaging modes are switched or a switching request is output.

15. The method for controlling the imaging system according to claim 14, wherein in a case where the specific object is authenticated for a longer time in the image data generated by the second imaging apparatus than in the image data generated by the first imaging apparatus, the image data generated by the second imaging apparatus is determined to be more appropriate as the actual image to be recorded.

16. The method for controlling the imaging system according to claim 15, wherein in a case where time elapsed from when the specific object is authenticated for a longer time in the image data generated by the second imaging apparatus than in the image data generated by the first imaging apparatus reaches or exceeds a predetermined time, the at least two imaging modes are switched.

17. The method for controlling the imaging system according to claim 10, further comprising displaying the current imaging modes of the first and second imaging apparatuses.

* * * * *